United States Patent
Deeter et al.

(10) Patent No.: US 9,928,484 B2
(45) Date of Patent: *Mar. 27, 2018

(54) SUGGESTING TAGS IN STATUS MESSAGES BASED ON SOCIAL CONTEXT

(75) Inventors: Ken Deeter, San Francisco, CA (US); Keith Schacht, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 533 days.

This patent is subject to a terminal disclaimer.

(21) Appl. No.: 13/167,702

(22) Filed: Jun. 24, 2011

(65) Prior Publication Data

US 2012/0331064 A1    Dec. 27, 2012

(51) Int. Cl.
  *G06F 17/30* (2006.01)
  *G06Q 10/10* (2012.01)
  *G06Q 50/00* (2012.01)

(52) U.S. Cl.
  CPC ............. *G06Q 10/10* (2013.01); *G06Q 50/01* (2013.01)

(58) Field of Classification Search
  None
  See application file for complete search history.

(56) References Cited

U.S. PATENT DOCUMENTS

| | | | |
|---|---|---|---|
| 8,135,617 B1* | 3/2012 | Agostino et al. | 705/14.4 |
| 8,909,643 B2 | 12/2014 | Ankan | |
| 2007/0288461 A1* | 12/2007 | Burrows et al. | 707/6 |
| 2008/0059421 A1* | 3/2008 | Baartman et al. | 707/3 |
| 2008/0065655 A1* | 3/2008 | Chakravarthy et al. | 707/100 |
| 2010/0030715 A1* | 2/2010 | Eustice | G06Q 10/10 706/12 |
| 2010/0082376 A1* | 4/2010 | Levitt | 705/7 |
| 2010/0114887 A1* | 5/2010 | Conway et al. | 707/737 |
| 2010/0145678 A1* | 6/2010 | Csomai et al. | 704/9 |
| 2010/0169441 A1* | 7/2010 | Lafleur | G06F 17/276 709/206 |
| 2011/0087534 A1* | 4/2011 | Strebinger | G06Q 10/06 705/14.25 |
| 2011/0320548 A1* | 12/2011 | Jonsson | G06F 3/0237 709/206 |
| 2012/0290950 A1 | 11/2012 | Rapaport et al. | |
| 2012/0331063 A1 | 12/2012 | Rajaram | |
| 2012/0331064 A1 | 12/2012 | Deeter et al. | |
| 2014/0052540 A1 | 2/2014 | Rajaram et al. | |

* cited by examiner

*Primary Examiner* — Neveen Abel Jalil
*Assistant Examiner* — Dawaune Conyers
(74) *Attorney, Agent, or Firm* — Fenwick & West LLP

(57) ABSTRACT

A social networking system determines the meaning of an anchor term used in a communication received from a communicating user. Candidate nodes are identified in the dictionary based on the anchor term, where each candidate node represents a possible meaning of the anchor term. The context of the anchor term is determined, and a score is determined for each candidate node based on the determined context. A candidate node is selected that most likely represents the meaning of the anchor term based on the determined candidate node scores. The context of the anchor term may be a social context derived from users connected to the communicating user that use the anchor term in communications. A communicating user may be prompted to identify the meaning of the anchor term explicitly based on the use of the term in communications from other users connected to the communicating user.

23 Claims, 9 Drawing Sheets

SUGGESTING TAGS IN STATUS MESSAGES BASED ON SOCIAL CONTEXT

BACKGROUND

This invention relates generally to social networking, and in particular to inferring the topics of communications of social networking system users.

Social networking systems commonly provide mechanisms allowing users to interact within their social networks. A social networking system user may be an individual or any other entity, such as a business or other non-person entity. Social networking system information that is tracked and maintained by a social networking system may be stored as a social graph, which includes a plurality of nodes that are interconnected by a plurality of edges. A social graph node may represent a social networking system object that can act on and/or be acted upon by another node. A social networking system object may be, for example, a social networking system user, non-person entities, content items, groups, social networking system pages, events, messages, subjects (such as persons, places, things, abstract ideas or concepts), or other social networking system objects, such as movies, bands, or books.

An edge between nodes in a social graph represents a particular kind of connection between the nodes, which may result from an action that was performed by one of the nodes on the other node. Examples of such actions by a social networking system user include listing social networking system objects in a user profile, subscribing to or joining a social networking system group or fan page, sending a message to another social networking system user, making a purchase associated with a social networking system node, commenting on a content item, or RSVP'ing to an event.

A subset of a social graph may include a subject dictionary. A subject dictionary (hereinafter "dictionary") includes a node for each possible topic that can be inferred from a user's status message. For example, dictionary nodes may represent particular people, locations, historical occurrences, times or dates, animals, plants, concepts, or any other subject matter. Edges between dictionary nodes may indicate a relationship between the subject matters represented by the nodes. For example, an edge may connect a "dog" dictionary node to an "animal" dictionary node to represent that a dog is a type of animal. Similarly, an edge may connect a "1942" dictionary node to a "World War II" node to represent that World War II took place, in part, in the year 1942. "Topic" as used herein refers to the definition, meaning, or subject of one or more words in a communication.

A social networking system may allow a user to communicate within certain social networking system spaces. For example, a user may post a message to the user's profile or wall or to another user's profile or wall, may comment on the user's content items or another user's content items (such as wall posts, images, videos, documents, etc.), may send an instant message or an email to another user, may post a message on a group wall or to a fan page, may ask a question to one or more other users, or any other form of communication within the social networking system. In addition, communications may originate external to the social networking system but may be received, organized and routed to a user within the social networking system. Alternatively, communications may originate from within the social networking system but may be transmitted outside the social networking system.

Communications by social networking system users are often plain text and are not manually associated by the users with established subjects. This limits the ability of the social networking system to correlate communications with particular subjects, and limits the functionality of displaying these correlations to users in conjunction with the communications. Further, words may have many meanings, and automated topic recognition may result in the meaning of ambiguous words being determined incorrectly. Thus, there is a need for a solution that determines the underlying topic of communications words, enhancing the richness of information connectivity with the social networking system, and providing a more enjoyable and useful experience to social networking system users.

SUMMARY

Embodiments of the invention infer topics discussed in social networking system communications. In one embodiment, an anchor term is identified in a communication (e.g., a post) received from a user of the social networking system. Candidate nodes that match the anchor term are identified in a dictionary, where each candidate node represents a particular meaning for the anchor term. In one embodiment, a dictionary including a plurality of nodes, each representing a subject, is created from a database. A category tree may also be created using the dictionary nodes, and the category tree may be used to eliminate candidate nodes from consideration as representing the meaning of the anchor term. The context of the anchor term in the communication is determined, and a score is determined for each candidate node based on the determined context. Here, the context of the anchor term may include any information that may be helpful in determining the meaning of the anchor term, such as information about other terms used in this or other communications, user profile information related to possible meaning of the anchor term, or any other information used for this purpose. A candidate node most likely to represent the meaning of the anchor term is selected based on the determined scores, and this candidate node is then associated with the user's communication as an inferred topic of that communication.

The social networking system may improve the accuracy of the inferred topics using social information about a plurality of communications having inferred topics. For example, if a user's friends are talking about a certain topic, the user is more likely to be talking about that topic as well. Accordingly, embodiments of the invention take into account the social context of an anchor term in a communication when inferring the meaning of that term. As used herein, the social context of the anchor term may include the context of the anchor term in communications of users connected to the communicating user, such as the other terms in the communications of the users connected to the communicating user, the interests of the users connected to the communicating user, or any other information used to determined the meaning of the anchor term.

The social networking system may also prompt a user to identify an intended topic for an anchor term explicitly while the user is typing the communication. Embodiments of the invention score candidate nodes based on their likelihood of being the user's intended meaning for an anchor term. The scores may be based on any techniques described herein, including social context. The system prompts the user to select a particular candidate node by presenting a menu of the candidate nodes, which may be ordered according to the determined scores.

Figure 1:
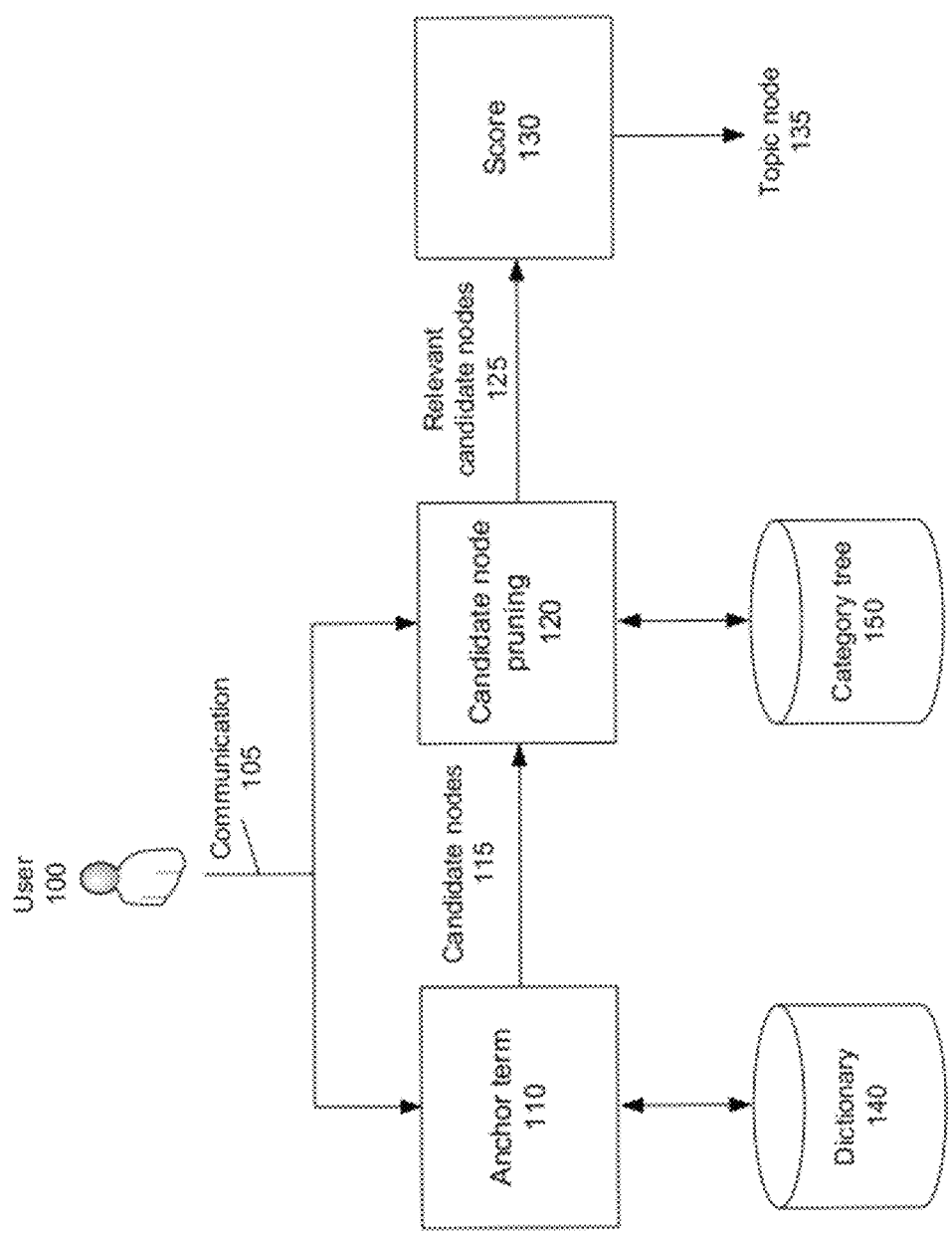
FIG. 1 is a diagram of a process for determining a topic of a social networking system communication, according to one embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

Social networking systems commonly provide mechanisms allowing users to interact with objects and other users both within and external to the context of the social networking system. A social networking system user may be an individual or any other entity, such as a business or other non-person entity. The social networking system may utilize a web-based interface comprising a series of inter-connected pages displaying and allowing users to interact with social networking system objects and information. For example, a social networking system may display a page for each social networking system user comprising objects and information entered by or related to the social networking system user (e.g., the user's "profile"). Social networking systems may also contain pages containing pictures or videos, dedicated to concepts, dedicated to users with similar interests ("groups"), or containing communications or social networking system activity to, from or by other users. Social networking system pages may contain links to other social networking system pages, and may include additional capabilities such as search, real-time communication, content-item uploading, purchasing, advertising, and any other web-based technology or ability. It should be noted that a social networking system interface may be accessible from a web browser or a non-web browser application, such as a dedicated social networking system mobile device or computer application. Accordingly, "page" as used herein may be a web page, an application interface or display, a widget displayed over a web page or application, a box or other graphical interface, an overlay window on another page (whether within or outside the context of a social networking system), or a web page external to the social networking system with a social networking system plug in or integration capabilities.

As discussed above, a social graph includes a set of nodes (representing social networking system objects) interconnected by edges (representing interactions, activity, or relatedness). A social networking system object may be a social networking system user, non-person entity, content item, group, social networking system page, location, application, subject, concept or other social networking system object, such as a movie, a band, or a book. Content items include anything that a social networking system user or other object may create, upload, edit, or interact with, such as messages, queued messages (e.g., email), text and SMS (short message service) messages, comment messages, messages sent using any other suitable messaging technique, an HTTP link, HTML files, images, videos, audio clips, documents, document edits, calendar entries or events, and other computer-related files. Subjects and concepts, in the context of a social graph, comprise nodes that represent any person, place, thing, or abstract idea.

A social networking system may allow a user to enter and display information related to the user's interests, education and work experience, contact information, and other biographical information in the user's profile page. Each school, employer, interest (for example, music, books, movies, television shows, games, political views, philosophy, religion, groups, or fan pages), geographical location, network, or any other information contained in a profile page may be represented by a node in the social graph. A social networking system may allow a user to upload or create pictures, videos, documents, songs, or other content items, and may allow a user to create and schedule events. Content items and events may be represented by nodes in the social graph.

A social networking system may provide a variety of means to interact with non-person objects within the social networking system. For example, a user may form or join groups, or become a fan of a fan page within the social networking system. In addition, a user may create, download, view, upload, link to, tag, edit, or play a social networking system object. A user may interact with social networking system objects outside of the context of the social networking system. For example, an article on a news web site might have a "like" button that users can click. In each of these instances, the interaction between the user and the object may be represented by an edge in the social graph connecting the node of the user to the node of the object. A user may use location detection functionality (such as a GPS receiver on a mobile device) to "check in" to a particular location, and an edge may connect the user's node with the location's node in the social graph.

Social networking systems allow users to associate themselves and establish connections with other users of the social networking system. When two users explicitly establish a connection in the social networking system, they become "friends" (or, "connections") within the context of the social networking system. Being friends in a social networking system may allow users access to more information about each other than would otherwise be available to unconnected users. For instance, being friends may allow a user to view another user's profile, to see another user's friends, or to view pictures of another user. Likewise, becoming friends within a social networking system may allow a user greater access to communicate with another user, such as by email (internal and external to the social networking system), instant message, text message, phone, or any other communicative interface. Finally, being friends may allow a user access to view, comment on, download, endorse or otherwise interact with another user's uploaded content items. Establishing connections, accessing user information, communicating, and interacting within the context of the social networking system may be represented by an edge between the nodes representing two social networking system users.

In addition to explicitly establishing a connection in the social networking system, users with common characteristics may be considered connected for the purposes of determining social context for use in determining the topic of communications. In one embodiment, users who belong to a common network are considered connected. For example, users who attend a common school, work for a common company, or belong to a common social networking system group may be considered connected. In one embodiment, users with common biographical characteristics are considered connected. For example, the geographic region users were born in or live in, the age of users, the gender of users and the relationship status of users may be used to determine whether users are connected. In one embodiment, users with common interests are considered connected. For example, users' movie preferences, music preferences, political views, religious views, or any other interest may be used to determine whether users are connected. In one embodiment, users who have taken a common action within the social networking system are considered connected. For example, users who endorse or recommend a common object, who comment on a common content item, or who RSVP to a common event may be considered connected. A social networking system may utilize a social graph to determine users who are connected with a particular user in order to determine or evaluate the social context of the communications of the particular user, as will be described below in greater detail.

A social networking system may provide a variety of communication channels to users. For example, a social networking system may allow a user to email, instant message, or text/SMS message, one or more other users; may allow a user to post a message to the user's wall or profile or another user's wall or profile; may allow a user to post a message to a group or a fan page; or may allow a user to comment on an image, wall post or other content item created or uploaded by the user or another user. In one embodiment, a user posts a status message to the user's profile indicating a current event, state of mind, thought, feeling, activity, or any other present-time relevant communication. A social networking system may allow users to communicate both within and external to the social networking system. For example, a first user may send a second user a message within the social networking system, an email through the social networking system, an email external to but originating from the social networking system, an instant message within the social networking system, and an instant message external to but originating from the social networking system. Further, a first user may comment on the profile page of a second user, or may comment on objects associated with a second user, such as content items uploaded by the second user. The topic for a term in any communication within the social networking system may be determined, as will be described in greater detail below.

FIG. 1 is a diagram of a process for determining a topic of a social networking system communication, according to one embodiment. In the embodiment of FIG. 1, a social networking system user 100 creates a communication 105 within the context of the social networking system. The communication 105 is received by the anchor term module 110, which parses the communication 105 to identify an anchor term. An anchor term is a word or other alphanumeric group of characters in the communication 105, the meaning of which the process of the embodiment of FIG. 1 determines. In one embodiment, multiple anchor terms are identified in a communication 105, though the remainder of the description herein is limited to instances where a single anchor term is identified for the purposes of simplicity.

The anchor term module 110 may be coupled to a dictionary storage module 140 which contains a dictionary including interconnected nodes representing candidate topics for an anchor term. The nodes of the dictionary may be connected based on relatedness between nodes, as discussed above. In one embodiment, the anchor term module 110 identifies an anchor term in a received communication 105 by identifying a term in the communication 105 with one or more associated nodes in a dictionary stored in dictionary storage module 140. For example, if the communication 105 contains the text "Go Sharks!", the anchor term module 110 may query the dictionary to identify nodes containing the term "sharks". In this example, the dictionary may respond to the query identifying the following nodes: Shark (animal), San Jose Sharks (hockey team), Jumping the Shark, and Loan Shark. The anchor term module 110 may identify an anchor term prior to querying the dictionary, or may identify an anchor term in response to receiving query feedback from the dictionary. In either embodiment, the anchor term module 110 may output identified dictionary nodes received from dictionary storage module 140 as candidate nodes 115. As used herein, "candidate nodes" represent potential meanings for an identified anchor term.

In one embodiment, a candidate node pruning module 120 receives candidate nodes 115 from the anchor term module 110, receives the communication 105 from the user 100, eliminates particular candidate nodes determined to be irrelevant to the anchor term, and outputs the remaining candidate nodes as relevant candidate nodes 125. The candidate node pruning module 120 identifies irrelevant candidate nodes by identifying and analyzing terms other than the anchor term in the communication 105 in view of each candidate node 115. The candidate node pruning module 120 may use a category tree to determine a measure of similarity or relatedness between candidate nodes and identified terms in the communication 105. The candidate node pruning module 120 may eliminate one or more candidate nodes 115 based on the measure of similarity or relatedness received from the category tree; the remaining candidate nodes are outputted as relevant candidate nodes 125.

The score module 120 receives the relevant candidate nodes 125 from the candidate node pruning module 120 and selects a candidate node from among the relevant candidate nodes 125 as most likely to represent the meaning of the anchor term. In one embodiment, the score module 130 generates a score for each received relevant candidate nodes 125. A candidate node score may be based on context words for the anchor term in the communication 105, based on the user's interests, based on a global communication context, and based on a social communication context. The score module 130 then selects a candidate node based on the generated candidate node scores and outputs the selected candidate node as the topic node 135. The topic node 135 is the dictionary node which best represents the meaning of the anchor term.

System Architecture

Figure 2:
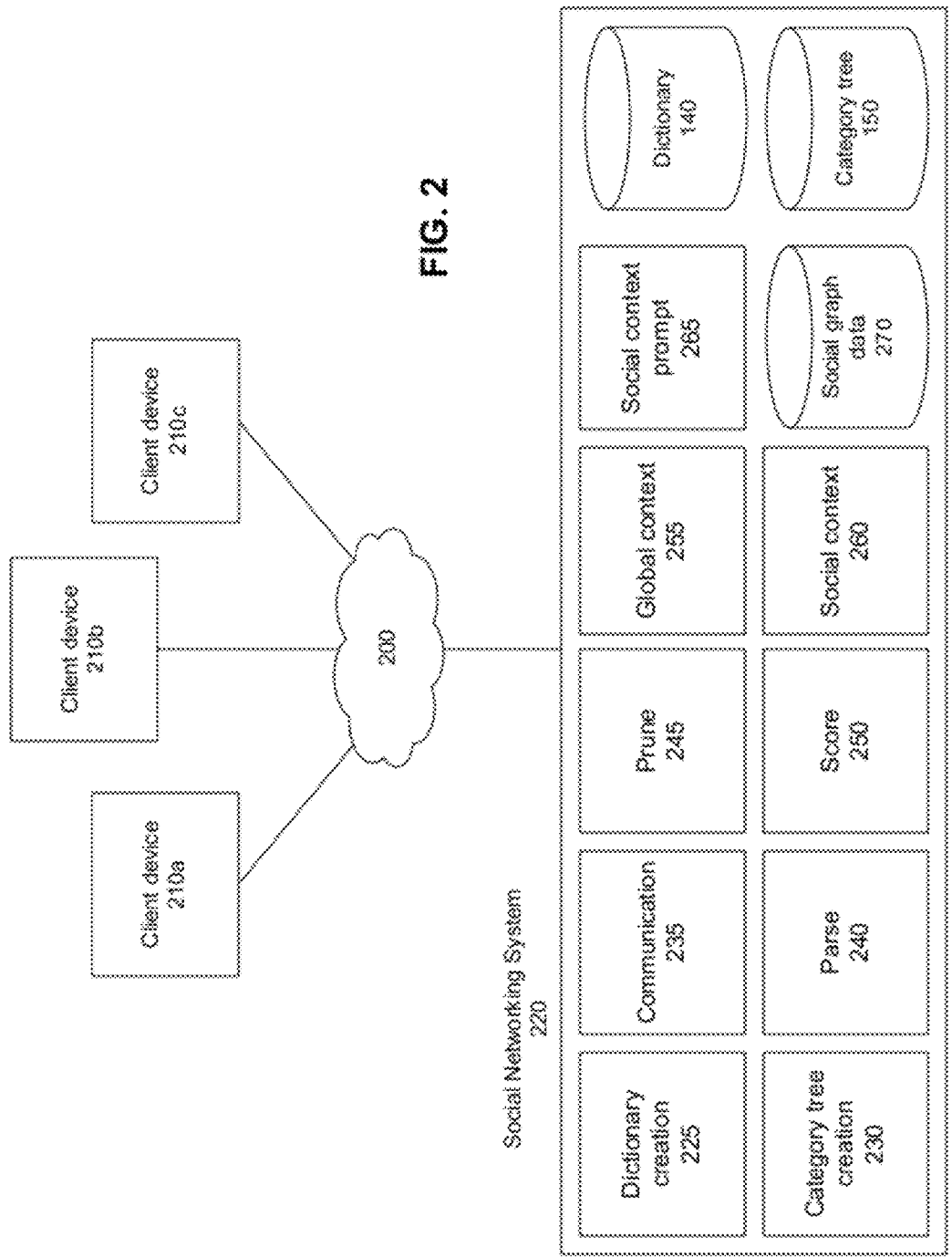
FIG. 2 is a high level block diagram of a system environment suitable for determining a topic of a social networking system communication, according to one embodiment.

FIG. 2 is a high level block diagram of a system environment suitable for determining a topic of a social networking system communication, according to one embodiment. The system environment comprises the client devices 210*a*, 210*b*, and 210*c* and a social networking system 220 that communicate through a connecting network 200. The connecting network 200 may be the Internet, a local area network, or any other network that allows communication between modules. The connecting network 200 may use standard communications technologies and/or protocols.

The client devices 210 may comprise any type of computing device capable of sending or receiving social networking system content, such as a mobile phone, laptop, desktop, netbook, tablet, cable box, or television. Although only three client devices 210 are shown in FIG. 2, any number of client devices may be connected to and communicate with the social networking system 230 at a time. A user of the client device 210 interacts with the social networking system 230 via an application, such as a web browser or a native application, to perform social networking system operations such as browsing content, posting and sending communications, establishing connections with other users, and the like.

The social networking system 220 may comprise a plurality of pages hosted on one or more web servers. The plurality of pages may present social networking system information. For example, these pages may include pages for user profiles, group profiles, fan pages, and other social networking system-related pages. These pages may include a variety of social networking system data, such as communications, personal information, user settings, group settings, search results, and advertisements, as well as object and interaction data, including but not limited to user actions, profile information, relationship information, communication information, group information, fan page information, endorsement information, and content items.

The social networking system 220 in the embodiment of FIG. 2 includes a dictionary creation module 225, a category tree creation module 230, a communication module 235, a parse module 240, a prune module 245, a score module 250, a global context module 255, a social context module 260, and a social context prompt module 265. In addition, the social networking system 220 includes a social graph data storage module 270, a dictionary storage module 140, and a category tree storage module 150. In alternative configurations, different and/or additional/fewer modules can be included in the social networking system 220. For example, the functionality of the global context module 255 and the social context module 260 may be performed by the score module 250.

The dictionary creation module 225 is used by the social networking system 220 to build a subject dictionary for use in determining the topic of a communication term. In one embodiment, a dictionary is stored as a subset of a social graph in the social graph data storage module 270. Alternatively, the dictionary may be stored independently of the social graph in the dictionary storage module 140. As discussed above, the dictionary includes a set of interconnected nodes, connected by edges representing relatedness between nodes.

The dictionary creation module 225 may create a dictionary once, updating the dictionary organically over time, or may create a new dictionary from scratch periodically. In one embodiment, the dictionary creation module 225 creates a dictionary based on a publicly available database, such as Wikipedia. In this embodiment, each Wikipedia page is represented by a node in the dictionary, and the nodes representing Wikipedia pages linked within a given page are connected to the node representing the given page by an edge.

In one embodiment, the dictionary creation module 225 creates a dictionary based on a publicly available database, and augments the dictionary based on the social graph. For example, the dictionary creation module 225 may identify Wikipedia pages for Company A and Company B that aren't linked to each other within Wikipedia, and may create a dictionary with nodes representing Company A and Company B that aren't linked to each other. In this example, the dictionary creation module 225 may use the social graph to modify the dictionary. For example, if Company A and Company B run a joint promotion through the social networking system 220, nodes representing Company A and Company B in the social networking system 220 may be connected by an edge representing the promotion. In this example, the dictionary creation module 225 may recognize the edge representing the promotion in the social graph and may connect the nodes representing Company A and Company B in the dictionary with an edge.

As discussed above, the dictionary may be stored in the social graph as a subset of the social graph. In this embodiment, the dictionary creation module 225 modifies the dictionary as the social graph evolves. The dictionary creation module 225 may periodically scan the publicly available database used to create the dictionary and may add or remove edges between dictionary nodes based on the changing contents of the publicly available database. The dictionary creation module 225 may add edges between dictionary nodes based on explicit associations by a user between communication terms and dictionary nodes. For example, a user may create the communication "Got an ice cream sandwich at AT&T Park!", and may associate the term "ice cream sandwich" with a node representing ice cream sandwiches and the term "AT&T Park" with a node representing the home stadium of the San Francisco Giants. In this example, the dictionary creation module 225 may create an edge between the AT&T Park node and the ice cream sandwiches node.

Figure 3:
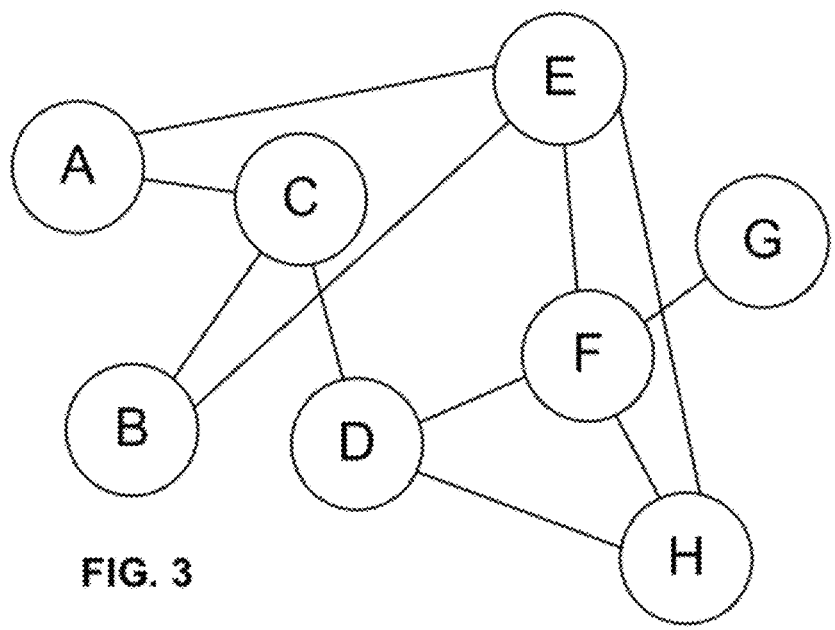
FIG. 3 is a diagram of a subject dictionary used for determining candidate topics for social networking system communications, according to one embodiment.

FIG. 3 is a diagram of an example subject dictionary, according to one embodiment. In the embodiment of FIG. 3, the example dictionary includes nodes A-H. Node A is connected by edges to Node C and Node E, representing a relatedness between Node A and Node C, and Node A and Node E. As discussed above, Node A, Node C, and Node E may represent articles on Wikipedia. In the embodiment of FIG. 3, the article represented by Node A may contain links to the articles represented by Node C and Node E, which the edges connecting Node A to Nodes C and E represent.

The category tree creation module 230 is used by the social networking system 220 to create a category tree used to reduce the number of candidate dictionary nodes under consideration as the meaning of an anchor term. The category tree created by the category tree creation module 230 may be stored in the category tree storage module 150, or may be stored as a subject of the social graph in the social graph data storage module 270. In one embodiment, a category tree is a hierarchical organization of all nodes in the dictionary, where each node has no more than one parent node and any number of child nodes, and where each node represents a subset of the subject matter represented by the node's parent node.

In one embodiment, the category tree creation module 230 uses the categorical and hierarchical organization of a database, such as Wikipedia, to create a category tree. In one embodiment, the category tree creation module 230 determines for each dictionary node a "best" parent node. For example, the database may contain a category graph which can be converted into a category tree. Each node in the database may have multiple potential parent nodes, and determining a single parent node for use in the category tree may involve computing a score for each potential parent node and selecting the potential parent node with the highest computed score.

Computing scores for potential parent nodes of a particular child node may be based on several factors. In one embodiment, potential parent nodes having node titles with nouns, noun phrases, verbs, verbs phrases, adjectives, adjective phrases, adverbs, and adverb phrases in common with either the child node or parent nodes of the potential parent nodes (grandparent nodes to the child node) are scored higher than potential parent nodes without such common grammatical constructs. In one embodiment, potential parent nodes in the form "A in B", such as "College sports in the United States", are scored higher than nodes in other forms. Likewise, potential parent nodes in the form "A by B", such as "Paintings by Picasso", are scored higher than nodes in other forms. In one embodiment, potential parent nodes with plural terms in the node title, such as "College sports", are scored higher than nodes without plural terms in the node title. In one embodiment, a first potential parent node with a greater number of child nodes than a second potential parent node is scored higher than the second potential parent node.

Figure 4:
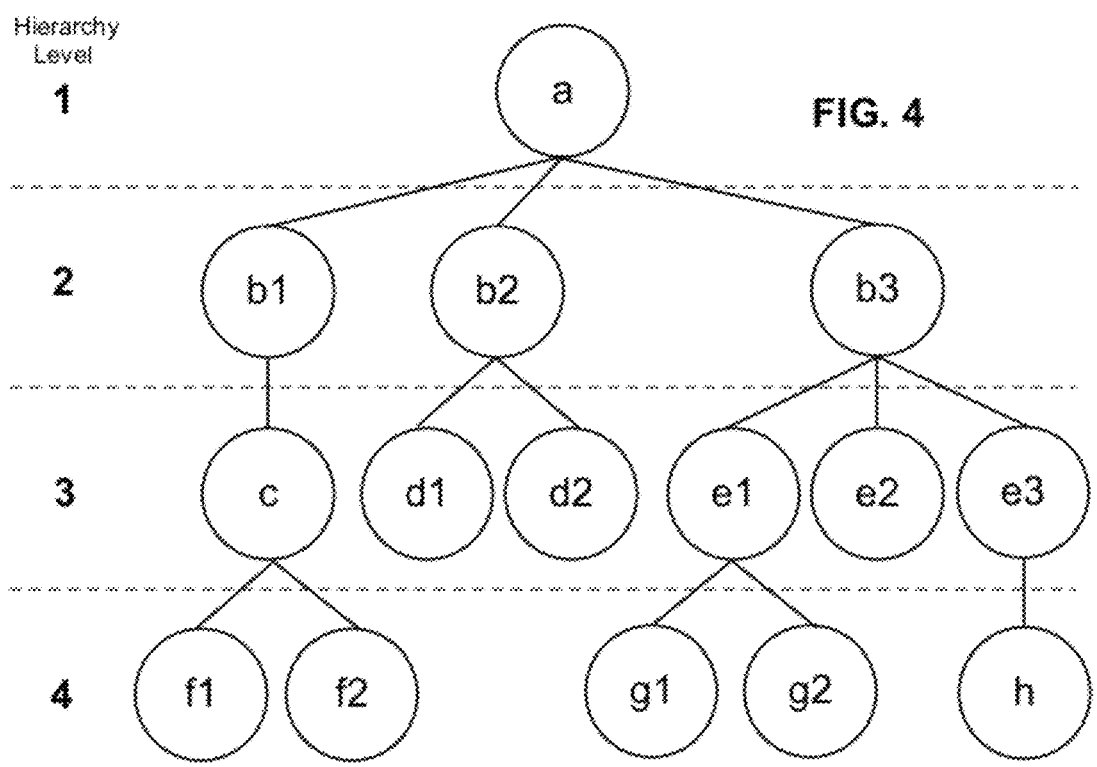
FIG. 4 is a diagram of a category tree used for pruning the set of candidate topics for social networking system communications, according to one embodiment.

FIG. 4 is a diagram of an example category tree, according to one embodiment. In the embodiment of FIG. 4, the example category tree includes Node a, which has child Nodes b1, b2, and b3. Likewise, Node b1 has child Node c, which in turn has child Nodes f1 and f2, and so forth. The category tree of the embodiment of FIG. 4 is organized into four hierarchy levels; other category trees may have any number of nodes and hierarchy levels.

The "distance" between any two nodes in a category tree is the minimum number of edges between the two nodes in the category tree. For example, the distance between Node f1 and Node e2 is 5, representing a first edge in the category tree between Node f1 and Node c, a second edge between Node c and Node b1, a third edge between Node b1 and Node a, a fourth edge between Node a and Node b3, and a fifth edge between Node b3 and Node e2.

The communication module 235 allows a user of the social networking system 220 to create a communication within the social networking system 235. The communication module 235 may include a GUI within a social networking system page for entering communications. For example, the communication module 235 may provide a text field within a social networking system web page or application for entering communications, which are subsequently uploaded to the social networking system 220. Alternatively, the communication module 235 may allow a user to create a communication external to the social networking system 220 and transmit the communication to the social networking system 220. For example, if a user sends a communication via text/SMS message to the social networking system 220, the communication module 235 receives the communication and stores/routes the communication accordingly.

The communication module 235 allows a user to create a variety of communications. For example, the communication module 235 may allow a user to create and send emails, instant messages, text/SMS messages, wall posts, status messages, or any other type of communication containing text. The communication module 235 may allow a user to direct a communication to another user, or may allow a user to create a communication that is not directed at another user, such as a post on the user's wall. The communication module 235 may allow a user to tag other users and other objects in communications by explicitly associating another user or an object with a term in the communication. For example, a user may post "Eating at Subway with Michael Johnson", and may tag the term "Subway" with a node in the dictionary or the social graph representing Subway Restaurants and the term "Michael Johnson" with a node in the dictionary or the social graph representing a friend of the user named Michael Johnson.

The parse module 240 parses communications into a set of terms and selects one or more of the parsed terms as an anchor term. In one embodiment, the parse module 240 parses a communication by words in the communication. For example, the communication "The SF Giants are my favorite team" would be parsed into seven terms, "The", "SF", "Giants", "Are", "My", "Favorite", and "Team". In one embodiment, the parse module 240 parses a communication by combination of two or more subsequent terms. Continuing with the previous example, the parse module 240 may additionally parse the term "SF Giants" from the given communication. The parse module 240 may parse a communication into terms independent of words. For example, the parse module 240 may parse a communication into fixed-character terms, such as 6-character terms, or may parse a communication into terms based on spaces in the communication. For example, the parse module 240 may parse the communication "b4 i go to the store, does any1 need anything" to include the terms "b4" and "any1".

The parse module 240 may eliminate words from communications prior to parsing the communication. In one embodiment, the parse module 240 removes prepositions, conjunctions, interjections, and/or articles from communications prior to parsing the communications. In one embodiment, the parse module 240 removes adjectives and/or pronouns from communications prior to parsing the communications. In one embodiment, the parse module 240 removes all terms except for nouns from communications prior to parsing the communications. The parse module 240 may eliminate words in a pre-determined set of words from communications prior to parsing the communications. The parse module 240 may spell-check words in a communication prior to parsing, and may replace misspelled or shorthand words with correctly spelled versions of the words. For example, the word "Juptier" may be replaced with "Jupiter", and the word "l8er" may be replaced with "later".

After the parse module 240 parses a communication into a set of terms, the parse module selects one of the terms as an anchor term. As discussed above, the principles discussed herein apply to embodiments in which the parse module 240 selects more than one anchor term for a given communication. For the purposes of simplicity, however, the remainder of the discussion will be limited to embodiments where the parse module 240 selects a single anchor term. In one embodiment, a first anchor term in a communication is selected and the meaning of the first anchor term is determined, and a second anchor term in the communication is subsequently selected.

The parse module 240 may select an anchor term in a number of ways. In one embodiment, the parse module 240 selects the first term in the set of terms as an anchor term. Alternatively, the parse module 240 may identify terms in the set of terms with previously determined meanings, and may select the first term in the set of terms the meaning of which has not previously been determined. In one embodiment, the parse module 240 may look up each term in the set of terms in the dictionary prior to selecting an anchor term, and may select the term that results in the most or least ambiguous set of dictionary results.

The parse module 240 looks up a term in the dictionary to identify dictionary nodes related to the term. The parse module 240 may look up a term in the dictionary stored in dictionary storage module 140, or may look up a term in a dictionary stored as a subset of the social graph in social graph data storage module 270. In one embodiment, looking up a term in the dictionary includes performing a keyword search of the dictionary using the term. For example, if the dictionary is queried using the term "Bears", all dictionary nodes including the word "Bears" in the title may be returned, such as nodes representing the Chicago Bears, the California Bears, and the band "The Bears". In one embodiment, looking up a term in the dictionary further includes performing a keyword search of the dictionary using common variants of the term, such as a plural form of the term, a singular form of the term, a past tense of the term, a future tense of the term, a present tense of the term, and so forth. Using the previous example, querying the dictionary further includes searching for nodes including the word "Bear" in the title, and may result in a return of nodes representing the movie "The Bear", and television host Bear Grylls. In one embodiment, looking up a term in the dictionary includes looking up synonyms of the term in the dictionary. For example, querying the dictionary using the term "cell phone" may include keyword searching the dictionary for the term "cell phone", "mobile phone", "wireless phone", "cell", "phone", etc.

The parse module 240 receives a set of dictionary nodes from the dictionary in response to querying the dictionary with a term. As discussed above, the parse module 240 may select an anchor term before or after querying the dictionary. In the latter embodiment, the parse module 240 queries the dictionary with more than one term from the set of parsed terms, and receives more than one set of dictionary nodes from the dictionary in response. The parse module 240 may select an anchor term based on the received sets of dictionary nodes. For example, the parse module 240 may select an anchor term based on which term is associated with the smallest received set of dictionary nodes, or based on which term is associated with the largest received set of dictionary nodes.

The parse module 240 determines a set of candidate dictionary nodes for the anchor term. Each candidate node in the set of candidate nodes represents a possible meaning for the anchor term. In one embodiment, each candidate node in the set of candidate nodes is scored for selection as a topic node. In an alternative embodiment, the set of candidate nodes is analyzed and reduced by prune module 245 prior to being scored. In this embodiment, the prune module 245 may query a category tree stored in the category tree storage module 150, or stored as a subset of the social graph stored in the social graph storage module 270, to reduce the set of candidate nodes.

The prune module 245 selects one or more parsed terms in the communication other than the anchor term and queries a category tree with the one or more selected parsed terms and each candidate node. In one embodiment, the prune module 245 selects terms adjacent to the anchor term in the communication. In one embodiment, the prune module 245 selects terms within a predetermined distance of the anchor term. For example, the prune module 245 may select one or more terms within three terms of the anchor term. In this example, for the communication "Bought the movie Titanic at the mall today" and the anchor term "mall", the prune module 245 may select the term "Titanic" since it is within three terms of "mall", but not "movie", since it is not within three terms of "mall". Alternatively, the candidate node pruning module 120 may select all terms in the communication 105 other than the anchor term.

For each candidate note, the prune module 245 queries the category tree with the one or more communication terms selected by the prune module 245 and the candidate node, and determines a measure of similarity or relatedness between the candidate node and the one or more selected terms. In one embodiment, the category tree includes the set of dictionary nodes organized hierarchically, as described above. In this embodiment, the measure of similarity or relatedness between a candidate node and the one or more selected terms is a distance representing the number of category tree edges between a candidate node and a node representing one of the one or more communication terms selected by the prune module 245.

The prune module 245 eliminates candidate nodes from consideration as the topic node most likely to represent the meaning of the anchor term based on the received measures of similarity or relatedness. In one embodiment, the prune module 245 eliminates candidate nodes that do not satisfy a pre-determined or a relative threshold of similarity or relatedness to the communication terms selected by the prune module 245. For example, the prune module 245 may eliminate candidate nodes with an average distance from nodes representing selected terms in the communication of 5 or greater, or may eliminate the three candidate nodes that are the least similar or related to selected terms. Candidate nodes eliminated by the prune module 245 are not scored for selection as a topic node.

The score module 250 produces scores for candidate nodes based on the other terms in a communication, user interests and preferences, global communication context, and social communication context, and selects a candidate node as a topic node determined to best represent the meaning of the anchor term based on the produced candidate node scores. In one embodiment, the score module 250 receives global communication context from global context module 255 and social communication context from social context module 260. In another embodiment, the score module 250 produces candidate node scores which are subsequently adjusted by the global context module 255 and the social context module 260. The score module 250 may produce and maintain a score for each candidate node. In one embodiment, the scores produced by the score module 250 are numeric and range between 0 and 1. The score module 250 may assign each candidate node an initial score, for example 0.5. In one embodiment, the score module 250 adjusts initial candidate node scores for each additional factor analyzed.

The score module 250 may select the candidate node with the highest candidate node score as a topic node that best represents the meaning of the anchor term. In one embodiment, the score module 250 selects a topic node once per identified anchor term. In an alternative embodiment, the score module 250 may re-produce scores for candidate nodes and may re-select a candidate node as a topic node each time a user views the communication containing the anchor term. For example, each time a newsfeed including the communication containing the anchor term is refreshed, the score module 250 may produce and adjust the scores of candidate nodes, and may select the candidate node with the highest score.

Candidate node scores may be based on context words in the communication related to the anchor term. In one embodiment, score module 250 analyzes verbs in a communication which modify the anchor term. For example, for the anchor term "Harry Potter" in the communication "Watching Harry Potter", the score module 250 may score a candidate node associated with a Harry Potter movie higher than a candidate node associated with a Harry Potter book because the verb "watching" implies a movie instead of a book. In one embodiment, communications in the social networking system 220 are analyzed in a training phase prior to scoring candidate nodes to determine particular verbs, adjectives or other terms that are related to particular dictionary nodes. In this embodiment, training phase term/node relationship data is used in determining candidate node scores based on context words in the communication.

Candidate node scores may be based on the relatedness between the terms in the communication other than the anchor term and the candidate nodes. In one embodiment, the candidate node scores may be based on the measure of similarity or relatedness between communication terms other than the anchor term and the candidate nodes determined by the prune module 245. For example, a first candidate node with an average distance of 3 between other communication terms and the first candidate node in a category tree may be scored higher than a second candidate node with an average distance of 5 between other communication terms and the second candidate node in the category tree. In one embodiment, the candidate node scores may be based on the number of paths between a candidate node and a node representing a term in the communication other than the anchor term. In one embodiment, the candidate node scores may be based on the probability that Wikipedia articles represented by a candidate node and a node representing a term in the communication other than the anchor term are related as discussed in "Learning to Link with Wikipedia" (http://www.cs.waikato.ac.nz/~dnk2/publications/CIKM08-LearningToLinkWithWikipedia.pdf).

Candidate node scores may be based on user interests, biographical information, geographical information or social networking system activity. In one embodiment, score module 250 retrieves user interest information, such as information entered by a user into the user's profile, and adjusts candidate node scores based on the retrieved profile information. For example, a "Sharks (hockey team)" candidate node may be scored higher than a "Sharks (animal)" candidate node if a user has entered "San Jose Sharks" into a Favorite Sports Team section of the user's profile, if the user has entered "Hockey" into a hobbies section of the user's profile, or if the user has joined a "Sharks hockey" group. Any information related to the user of a social networking system 220 may be used to produce and/or adjust candidate node scores, including but not limited to: current city or location, hometown, city or country of birth, gender, birthday, sexual orientation, languages spoken, school attended, employer, religious views, political views, music preferences, book preferences, movie preferences, television preferences, game preferences, sports played, favorite sports teams, favorite athletes, favorite hobbies or activities, interests, social networking system groups and fan pages, user activity within the social networking system 220, or any other information related to the user.

Candidate node scores may be based on previously established dates. In one embodiment, the score module 250 determines whether the current date coincides with established holidays, historical events, or other date-based occurrences, and adjusts candidate node scores based on these occurrences. Holidays, historical events and other occurrences may be determined from, for example, a publicly-available database, such as Wikipedia, or may be manually determined in advance. In this embodiment, if the score module 250 determines that the current date coincides with a known established date, the score module 250 may increase the candidate node scores of candidate nodes associated with the established date. For example, if the score module 250 determines that the current date is July 4, and if the score module 250 determines that the candidate node "Fireworks (pyrotechnics)" is associated with the date July 4, then the score module 250 increases the candidate node score for the candidate node "Fireworks (pyrotechnics)".

Candidate node scores may be based on anticipated occurrences and events. In one embodiment, the score module 250 determines whether the current date or time coincides with the date and time of anticipated events, and adjusts candidate node scores based on these occurrences. Sporting events, concerts, parties, parades, elections, graduations, sales, or any other occurrence or event may be determined from, for example, Wikipedia or any other source that establishes the date and time of occurrences and events available to the score module 250. In this embodiment, if the score module 250 determines that the current date and time coincides with the date and time of an anticipated occurrence or event, the score module 250 may increase the candidate node scores of candidate nodes associated with the anticipated occurrence or event. For example, if the score module 250 determines that a Gonzaga University basketball game is anticipated to occur during the current date and time, and if the score module 250 determines that the candidate node "Bulldogs (basketball team)" is associated with Gonzaga University, then the score module 250 increases the candidate node score for the candidate node "Bulldogs (basketball team)". Likewise, if the score module 250 determines that the current date is election day for the United States Senate, and if the score module 250 determines that the candidate node "Barbara Boxer (U.S. senator)" is associated with election data for the United States Senate, then the score module 250 increases the candidate node score for the candidate node "Barbara Boxer (U.S. senator)".

The global context module 255 and the social context module 260 may adjust candidate node scores based on analysis of global social networking system communications and the communications of users connected to the communicating user, respectively. In one embodiment, candidate node scores are increased or decreased by a constant amount, or by an amount relative to the analyzed communications. In one embodiment, analyzed communications are aggregated, and the candidate node scores are adjusted based on this aggregation. For example, if 50% of analyzed communications support an increase for a first candidate score, and 20% of analyzed communications support an increase for a second candidate score, the first candidate node score may be increased by 50% and the second candidate node may be increased by 20%. In one embodiment, the global context module 255 and the social context module 260 produce a global context score and a social context score, respectively, for each candidate node. In this embodiment, candidate node scores may be adjusted by adding or by multiplying the candidate node scores with the associated global context scores and/or social context scores.

The global context module 255 adjusts the candidate node scores based on global social networking system activity. In one embodiment, the global context module 255 analyzes communications of users across the social networking system 220 to identify information related to candidate node relevance. In one embodiment, the global context module 255 identifies terms in the analyzed communications other than the anchor term, and adjusts candidate node scores based on these identified terms. For example, for the anchor term "Sharks" in the communication "Go Sharks!", the global context module 255 may analyze all other communications which contain the word "shark". In this example, the global context module 255 may identify a subset of these communications which also include the word "Hockey". Accordingly, the global context module 255 may increase the score of a "Sharks (hockey team)" candidate node, and may decrease the score of a "Sharks (animal)" node. Continuing with this example, the global context module 255 may identify the term "Go" in global communications related to the candidate "Sharks (hockey team)", and may increase the score of the "Sharks (hockey team)" candidate node for the communication "Go Sharks!" accordingly.

In one embodiment, the analysis of communications across the social networking system 220 by global context module 255 is time-restrained. For example, the global context module 255 may only analyze the communications of users created in the previous hour, or the previous ten minutes. In one embodiment, the effect of analyzed communications across the social networking system 220 is weighted according to a time decay model, where the most recent communications are weighted the heaviest, and the most distant communications are weighted the lightest.

In one embodiment, the global context module 255 analyzes user information related to users across the social networking system 220 who use the identified anchor term in communications. In this embodiment, the global context module 255 may associate particular user information with the anchor term and with potential anchor term meanings, and may use these associations to adjust or weight candidate node scores. For example, the global context module 255 may identify communications from users that include the term "Sharks", may determine that a subset of these users list "hockey" as an interest, and may increase the score for a "Sharks (hockey team)" candidate node accordingly. In this example, the global context module 255 may increase the score for a "Sharks (hockey team)" candidate node only if the communicating user also lists "hockey" as an interest.

In one embodiment, the analysis of communications across the social networking system 220 by the global context module 255 includes determining whether other users have explicitly associated the anchor term with a social networking system object. The global context module 255 may identify a subset of communications that contain the anchor term and that associate the anchor term with a social networking system object. For example, a subset of communications that contain the word "Shark" may be associated with a San Jose Sharks group, or may contain a San Jose Sharks tag. In this example, the global context module 255 may increase the score for a "Sharks (hockey team)" candidate node accordingly.

The social context module 260 adjusts the candidate node scores based on the social networking system activity of users connected to the communicating user. In one embodiment, the social context module 260 adjusts the candidate node scores based on the communication activity of users that have explicitly established a connection to the communicating user (such as friends of the communicating user). Alternatively, the social context module 260 may adjust the candidate node scores based on the communication activity of users that share with the communicating user a common network, common biographical characteristics, common interests, or common social networking system activity.

The social context module 260 analyzes communications of users connected to the communicating user containing the anchor term to identify information related to candidate node relevance. The social context module 260 may identify communications containing the anchor term in which the anchor term is associated with a candidate node, and the social context module 260 increases the score for the associated candidate node. In one embodiment, the anchor term is explicitly associated with a candidate node by users connected to the communicating user. For example, the anchor term "Giants" in the communication "Let's go Giants!" from a user connected to the communicating user may be tagged to a "San Francisco Giants" social networking system object. In this example, the social context module 260 may increase the score for the candidate node "San Francisco Giants (baseball team)". In one embodiment, the anchor term is implicitly associated with a candidate node in communications by users connected to the communicating user. For example, the social networking system 220 may infer that the anchor term "Giants" in a communication from a user connected to the communicating user is associated with the San Francisco Giants. In this embodiment, the social context module 260 may increase the score for the candidate node associated "San Francisco Giants (baseball team)".

In one embodiment, the social context module 260 identifies one or more terms in the analyzed communications other than the anchor term and adjusts the candidate node scores based on these identified terms. One or more of the identified terms may be related to a particular candidate node, and the score of the particular candidate node may be increased accordingly. For example, for the anchor term "Giant", a user connected to the communicating user may post the message "Go Giants baseball!". In this example, the social context module 260 identifies the term baseball, determines that it is related to the candidate node "San Francisco Giants (baseball team)", and increases the score for this candidate node accordingly.

Similarly to the global context module 255, the analysis of communications across the social networking system 220 by the social context module 260 may be time-restrained. For example, the social context module 260 may only analyze the communications of users connected to the communicating user created in the previous hour, or the previous ten minutes. In one embodiment, the effect of analyzed communications is weighted according to a time decay model, where the most recent communications are weighted the heaviest, and the most distant communications are weighted the lightest.

In one embodiment, the social context module 260 analyzes user information related to users who are connected to the communicating user who create communications containing the anchor term. In this embodiment, the social context module 260 may associate particular user information with the anchor term and with potential anchor term meanings, and may use these associations to adjust or weight candidate node scores. For example, the social context module 260 may identify communications from users connected to the communicating user that include the term "Giants", may determine that a subset of these users list "baseball" as an interest, and may increase the score for a "San Francisco Giants (baseball team)" candidate node accordingly. In this example, the social context module 260 may increase the score for a candidate node only if the communicating user also lists "baseball" as an interest.

The social context prompt module 265 may detect an ambiguous term in the communication of a communicating user, and may prompt a user connected to the communicating user to select the meaning of the ambiguous term when using the term in a communication. In one embodiment, the detected ambiguous term is an anchor term selected by the parse module 240. Likewise, the social context prompt module 265 may prompt a user connected to the communicating user to select a meaning for the ambiguous term by displaying the candidate nodes determined by the parse module to the user.

In one embodiment, the social context prompt module 265 tracks, for each user of the social networking system 220, a list of ambiguous terms used by connected users in communications. This tracking of ambiguous terms may be time-restrained, and may be, for example, limited to a period of two days, 12 hours, 30 minutes, or any pre-determined period of time. The list of ambiguous terms may include all identified anchor terms, including anchor terms with inferred meanings. In one embodiment, only anchor terms with inferred meanings below a pre-determined threshold of confidence are tracked by the social context prompt module 265.

In one embodiment, the social context prompt module 265 detects the usage of a tracked ambiguous term in a communication by a user. Detecting the usage of a tracked ambiguous term in a communication by a user may include the use of text prediction to determine when the user has begun entering one of the tracked ambiguous terms but has not yet completed entering the ambiguous term. In response to detecting the usage of a tracked ambiguous term, the social context prompt module 265 display to the user a list of possible meanings for the ambiguous term. The list of possible meanings displayed to the user may include previously identified candidate nodes (as discussed above). Alternatively, the list of possible meanings displayed to the user may be limited to tracked ambiguous terms which contain the text of the partially entered ambiguous term.

In one embodiment, the social context prompt module 265 may query the dictionary stored in the dictionary storage module 140 or as a subset of the social graph data storage module 270 to determine candidate nodes associated with the tracked ambiguous term. Candidate node scores may be determined for the determined candidate nodes, and the list of possible meanings displayed to the user is ordered based on the determined candidate node scores. In one embodiment, the list of possible meanings displayed to the user includes a subset of candidate nodes selected based on the candidate node scores.

The social context prompt module 265 may display a list of possible meanings for an ambiguous term to the user of the ambiguous term within a communication interface via the communication module 235. For example, if a user creates a communication containing an ambiguous term within a text entry box of a communication interface displayed by the communication module 235, the social context prompt module 265 may display a list of possible meanings below or within the text entry box. The user may select one of the meanings in the list of possible meanings for an ambiguous term. Continuing with the previous example, the user may click on or otherwise select one of the meanings displayed below or within the text box.

Selecting a meaning for an ambiguous term results in the association by the social context prompt module 265 of the ambiguous term with the selected meaning. In one embodiment, the ambiguous term is replaced with text representing the selected meaning. For example, the text "Giants" may be replaced with "San Francisco Giants" when selected by a user. In one embodiment, the plain text of the ambiguous term is replaced with hyperlinked text which, when selected, directs a user to a social networking system page or other webpage dedicated to an object related to the selected meaning. Continuing with the previous example, the plain text "Giants" may be replaced with a social networking system URL which, when clicked, directs a user to the San Francisco Giants fan page.

In response to the social context prompt module 265 associating an ambiguous anchor term with a meaning, the score module 250, the global context module 255 and the social context module 260 may adjust the candidate node scores associated with the anchor term, and may re-select a candidate node as a topic node best representing the meaning of the anchor term. For example, if the score module 250 initially selected the "Sharks (animal)" candidate node for the anchor term "Sharks" in the communication "Go Sharks!", the score module 250 may reselect the "San Jose Sharks (hockey team)" candidate node in response to the social context prompt module 265 associating the term "Sharks" with the San Jose Sharks in one or more communications by users connected to the communicating user. In addition, the score module 250, the global context module 255 and the social context module 260 may adjust the candidate node scores associated with the anchor term for users connected to the communicating user, and may re-select a candidate node as a topic node best representing the meaning of anchor terms in the communications of users connected to the communicating user.

Operation

Figure 5:
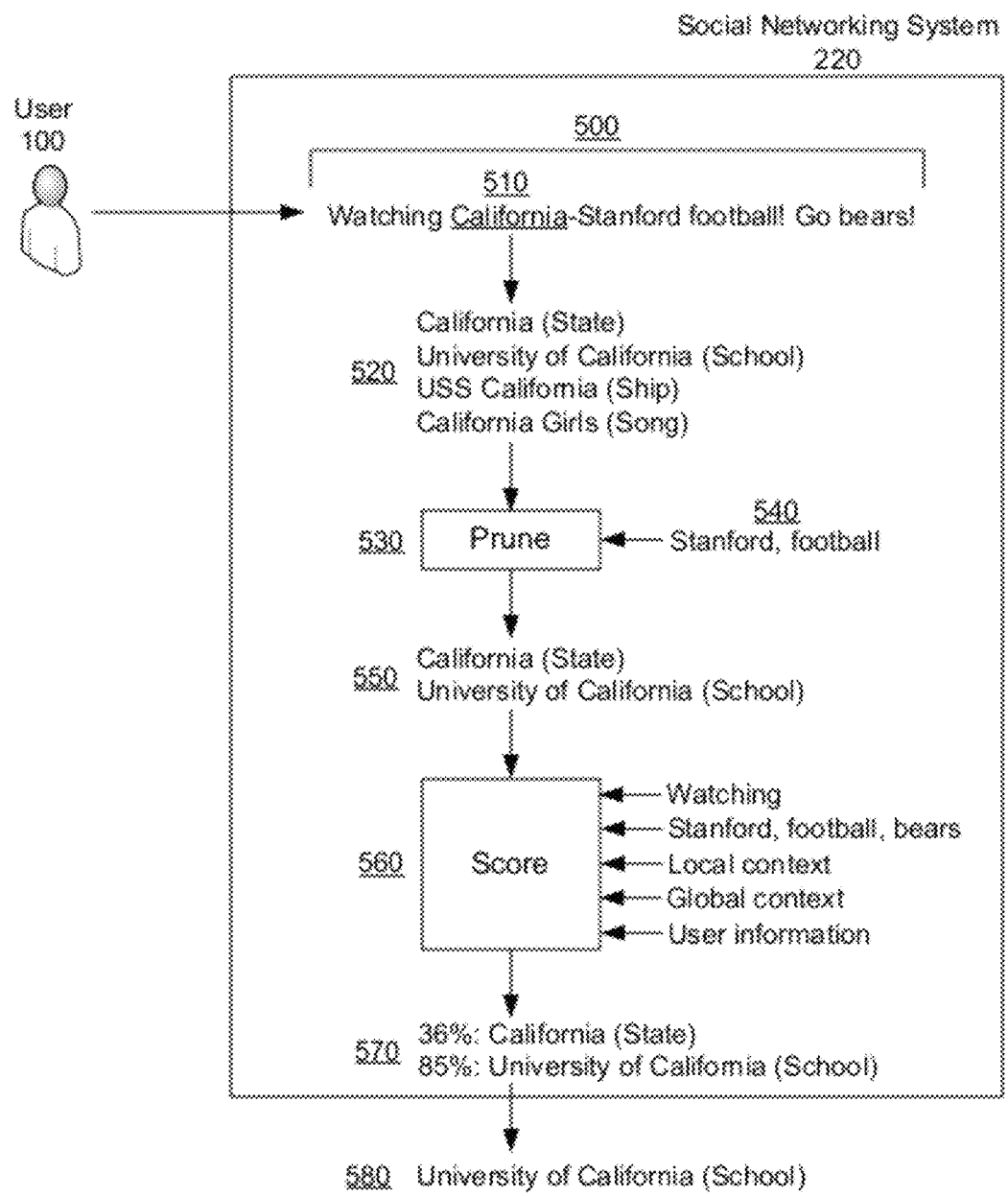
FIG. 5 is an example embodiment of the process for determining a topic of a social networking system communication, according to one embodiment.

FIG. 5 is an example embodiment of the process for determining a topic of a social networking system communication, according to one embodiment. The social networking system 220 receives a communication 500 from a communicating user. In the embodiment of FIG. 5, the communication 500 is "Watching California-Stanford football! Go bears!". The communication 500 is parsed, and the anchor term "California" is selected as an anchor term 510.

Candidate nodes 520 are selected for the anchor term California 510. As discussed above, a dictionary may be queried using, for example, keyword searching to identify candidate nodes related to the anchor term. In the embodiment of FIG. 5, the candidate nodes 520 identified are California (State), University of California (School), USS California (Ship), and California Girls (Song).

The candidate nodes 520 are optionally pruned by a pruning module 530. In the embodiment of FIG. 5, the pruning module 530 selects terms 540 within two words of the anchor term California 510, "Stanford" and "football". Note that in this particular embodiment, the term "bears" is not selected because of its distance in the communication 510 from the anchor term California 510. The selected terms 540 are analyzed to determine the relationship between the selected terms 540 and the candidate nodes 520. As discussed above, a category tree may be queried using the selected terms 540 and the candidate nodes 520. The pruning module 530 in the embodiment of FIG. 5 eliminates the candidate node USS California (Ship) and California Girls (Song).

In the embodiment of FIG. 5, the score module 560 receives and generates an initial score for the remaining candidate nodes 550. The score module 560 adjusts the candidate node scores based on other terms in the communication 500. In this embodiment, the score module 560 adjusts the candidate node scores based on the verb "watching" and the nouns "Stanford", "football" and "bears". The score module 560 also adjusts the candidate node scores based on information related to the user 100, and the global and social context of the anchor term California 510. In this embodiment, the generated candidate node scores 570 are 36% for the candidate node California (State) and 85% for the candidate node University of California (School). The candidate node University of California (School) is selected as the dictionary node 580 which best represents the meaning of the anchor term California 510 in the communication "Watching California-Stanford football! Go bears!" 500.

Figure 6:
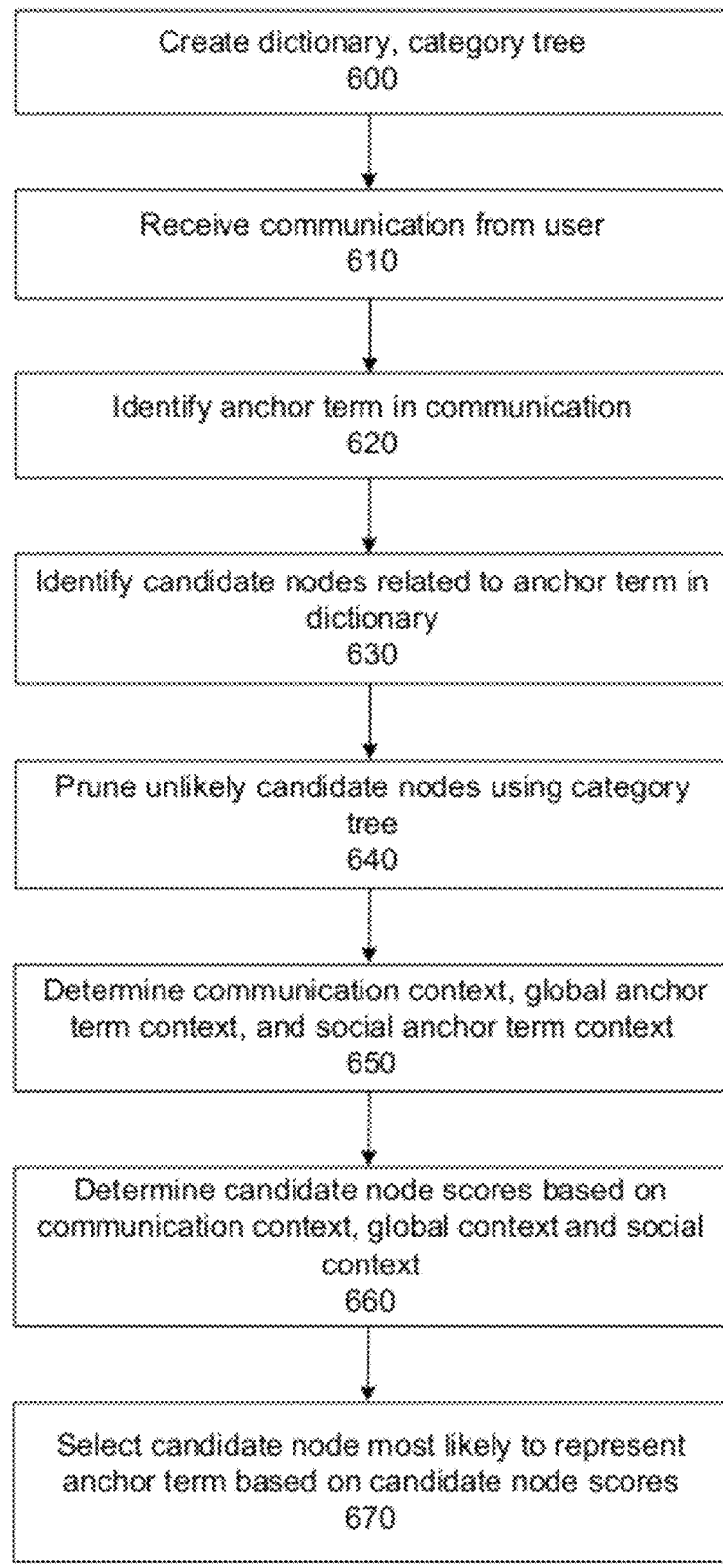
FIG. 6 is a flow chart illustrating a process for determining a topic of a social networking system communication term, according to one embodiment.

FIG. 6 is a flow chart illustrating a process for determining a topic of a social networking system communication term, according to one embodiment. In the embodiment of FIG. 6, a dictionary and a category tree are created 600. In an alternative embodiment, either the dictionary or the category tree or both are created in advance. Instead of creating a dictionary and a category tree from scratch, an existing dictionary and category tree may be updated by the process of FIG. 6. As discussed above, the dictionary and category tree may be created based on an existing database such as Wikipedia, where nodes in the dictionary and category tree represent a Wikipedia page.

A communication is received 610 from a communicating user. The communication may include a status message posted to the communicating user's wall or profile, an email, an instant message, a message posted to another user's wall or profile, a comment on a content item, a text/SMS message, or any other form of text-based communication. An anchor term is identified 620 in the communication using the dictionary. In one embodiment, the communication is parsed into parsed terms, and a parsed term is selected as the anchor term.

Candidate nodes related to the anchor term are identified 630 in the dictionary. In one embodiment, a keyword search of dictionary nodes is performed using the anchor term in order to identify candidate nodes related to the anchor term. Optionally, candidate nodes unlikely to represent the meaning of the anchor term are pruned 640 using the category tree.

The context of the communication, the global context of the anchor term, and the social context of the anchor term are determined 650. In one embodiment, the context of the communication includes terms in the communication other than the anchor term and information related to the communicating user (such as user preferences and interests listed in the user's profile). The global context of the anchor may include terms in communications by all other social networking system users which contain the anchor term and information related to these users. The social context of the anchor term may include terms in communications containing the anchor term by social networking system users connected to the communicating user and information related to these users.

Scores for the candidate nodes are determined 660 based on the context of the communication, the global context of the anchor term, and the social context of the anchor term. A candidate node most likely to represent the anchor term is selected 670 based on the candidate node scores. For example, the candidate node with the highest score is selected as the candidate node that is most likely to represent the meaning of the anchor term.

Figure 7:
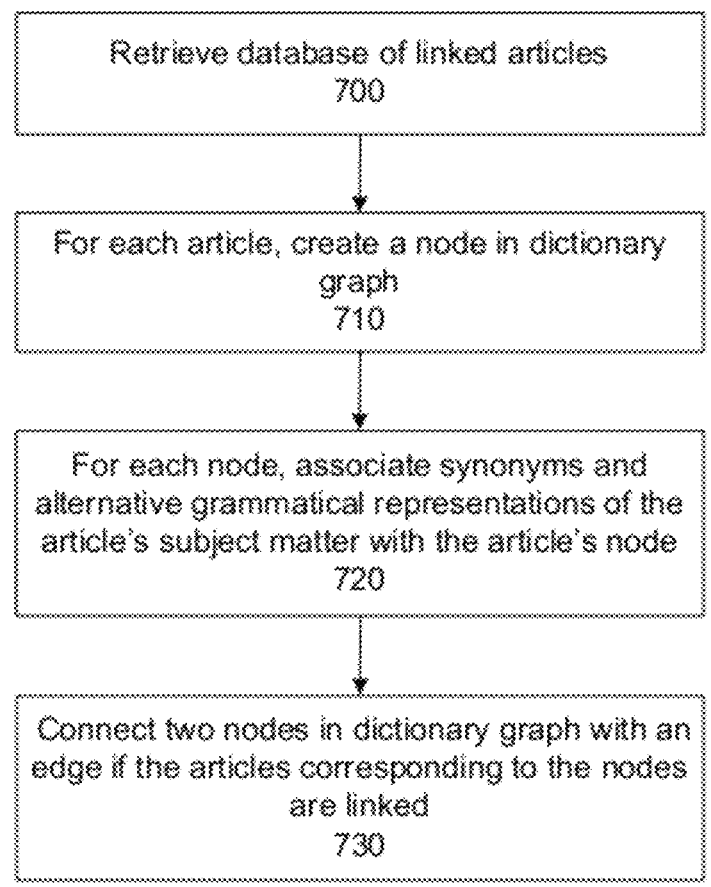
FIG. 7 is a flow chart illustrating a process for creating a subject dictionary, according to one embodiment.

FIG. 7 is a flow chart illustrating a process for creating a subject dictionary, according to one embodiment. A database of linked articles is retrieved 700. In one embodiment, this database is Wikipedia. For each article in the database, a node is created 710 in a dictionary graph. Optionally, synonyms and alternative grammatical text formats for each article's subject matter are associated 720 with each article's node. For example, "SJ Sharks" and "Sharks Hockey" may be associated with the dictionary node San Jose Sharks (hockey team). Nodes in the dictionary graph are connected 730 by edges if the articles corresponding to the nodes are linked. For example, if the Wikipedia article "Surfboard" contains a URL link to the Wikipedia article "Ocean", the Surfboard dictionary node is connected to the Ocean dictionary node by an edge.

Figure 8:
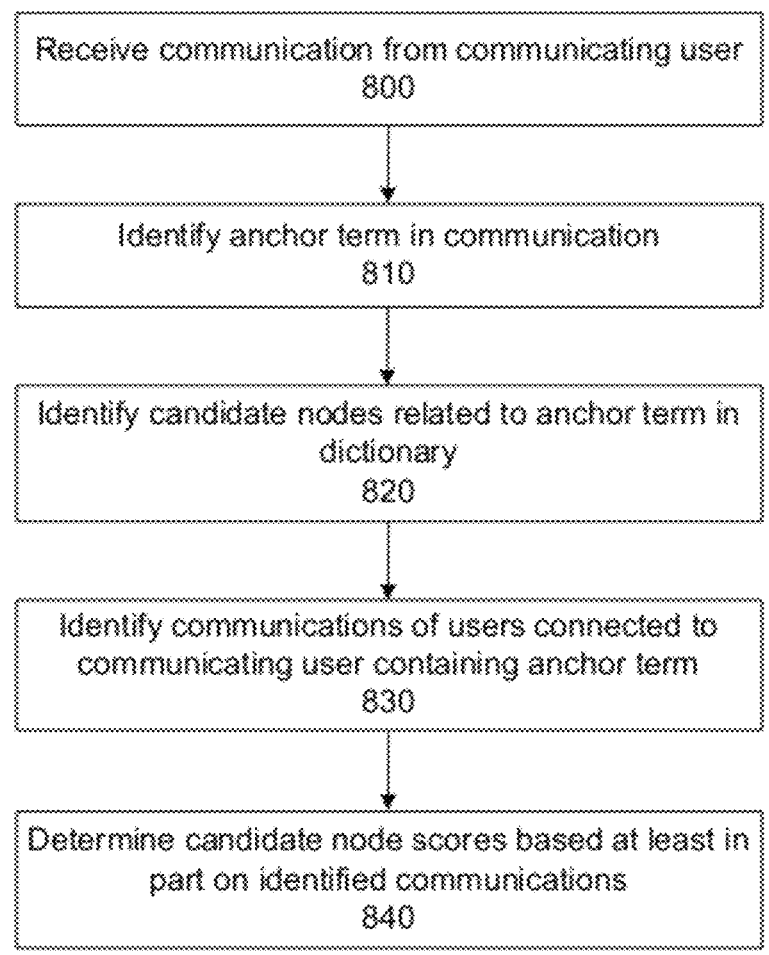
FIG. 8 is a flow chart illustrating a process for determining a topic of a social networking system communication term using social context, according to one embodiment.

FIG. 8 is a flow chart illustrating a process for determining a topic of a social networking system communication term using social context, according to one embodiment. In the embodiment of FIG. 8, a communication is received 800 from a communicating user. An anchor term is identified 810 in the communication using a dictionary. As discussed above, an existing dictionary may be used, or a dictionary may be created from a publicly available database of interlinked articles, such as Wikipedia. Candidate nodes related to the anchor term are identified 820 in the dictionary.

Communications are identified 830 from users connected to the communicating user that contain the anchor term. As discussed above, users connected to the communicating user may include friends or family of the communicating user, users with biographical information in common with the communicating user, users in the same network as the communicating user, and/or users with similar interests to the communicating user. Candidate node scores are determined 840 based at least in part on the identified communications. For example, candidate node scores may be determined based on the context of the identified communications, such as terms in the communications other than the anchor term and information related to the users connected to the communicating user.

Figure 9:
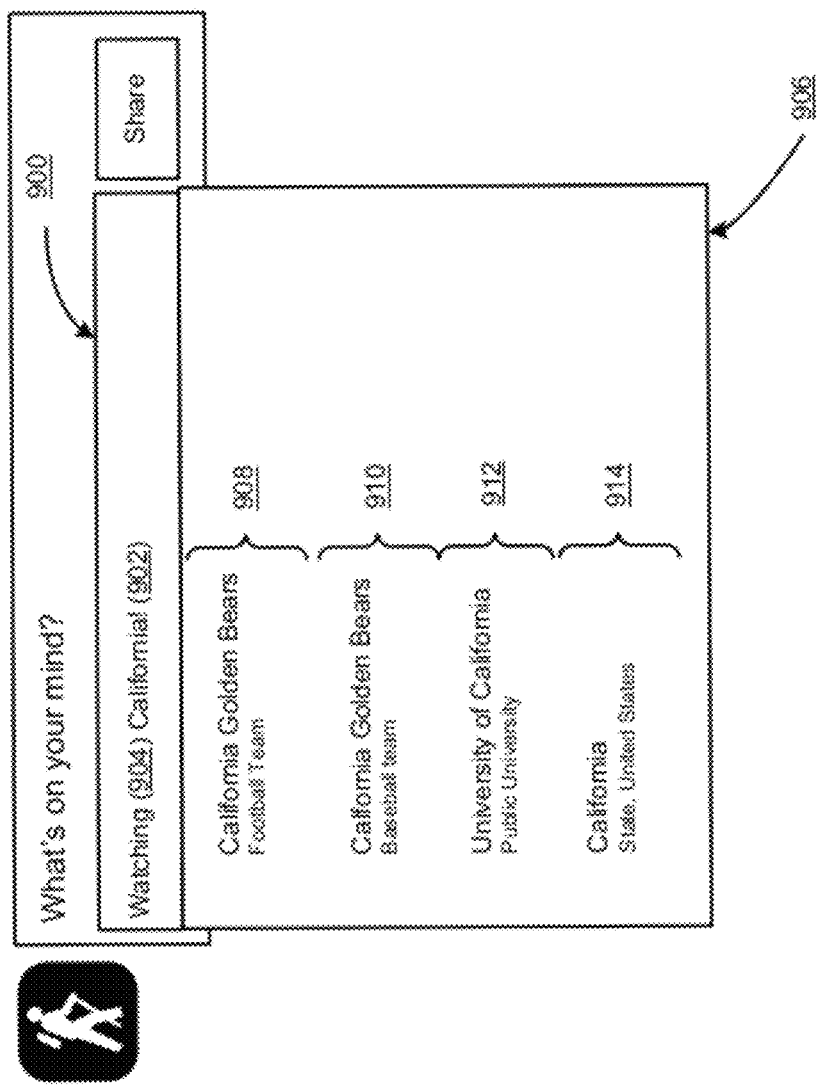
FIG. 9 is an example embodiment of a social networking system interface for prompting a user to select a topic for a communication term based on the communication of another user, according to one embodiment.

FIG. 9 is an example embodiment of a social networking system interface for prompting a user to select a topic for a communication term based on the communication of another user, according to one embodiment. A user enters the status message "Watching California!" into the status box 900. The term "California" is identified as the anchor term 902, and the term "Watching" is identified as a context term 904. The social networking system identifies the term "California" in the communications of one or more friends of the user, and in response, the social networking system prompts the user to select a best meaning for the term California.

In the embodiment of FIG. 9, the social networking system displays several topics in the drop-down box 906. The topics displayed are candidate nodes for the term California, including California Golden Bears (football team) 908, California Golden Bears (baseball team) 910, the University of California (public university) 912, and California (state, united states) 914. The candidate nodes displayed may be determined from the communications of the user's friends, or from the user's communication "Watching California!". In the embodiment of FIG. 9, a candidate node score is determined for each displayed candidate node, and the candidate nodes are ordered based on the determined candidate node scores. The user may then select one of the candidate nodes as the meaning that best represents the anchor term California.

Figure 10:
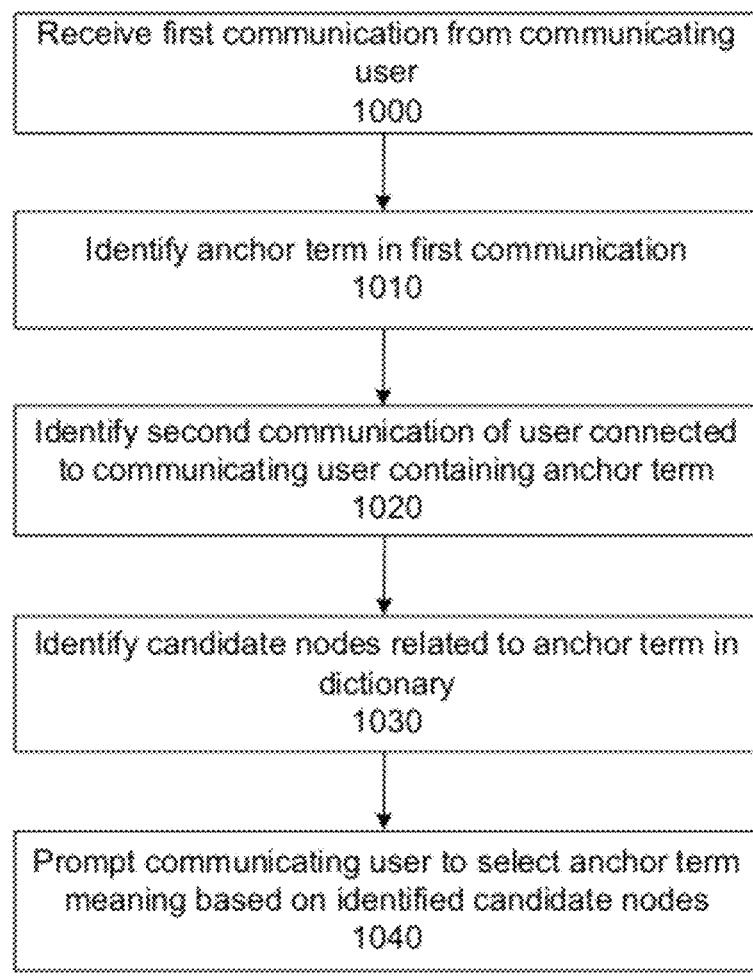
FIG. 10 is a flow chart illustrating a process for prompting a user to select a topic for a communication term based on a communication of another user, according to one embodiment.

FIG. 10 is a flow chart illustrating a process for prompting a user to select a topic for a communication term based on a communication of another user, according to one embodiment. A first communication is received 1000 from a communicating user. An anchor term is identified 1010 in the first communication using a dictionary. A second communication of a user connected to the communicating user containing the anchor term is identified 1020. Candidate nodes related to the anchor term are identified 1030 in the dictionary. The user is prompted 1040 to select a meaning for the anchor term based on the identified candidate nodes. For example, if a user types the term "sharks" in a communication, candidate nodes related to the term "sharks" are displayed for the user to select among.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
receiving a communication from a communicating user via an interface of a social networking system for communicating to social networking system users via the social networking system;
identifying an anchor term in the communication, the anchor term having multiple meanings and identified based on a set of dictionary nodes each associated with a potential meaning of the anchor term, the set of dictionary nodes identified by querying a dictionary with the anchor term;
identifying a set of candidate nodes based on the set of dictionary nodes from a dictionary that comprises a set of dictionary nodes, each dictionary node representing a topic, wherein each identified candidate node comprises a dictionary node that is a candidate for representing one of the multiple meanings of the anchor term;
after identifying the anchor term, determining a score for each of one or more of the candidate nodes representative of a likelihood that the candidate node represents one of the multiple meanings of the anchor term based at least in part on terms other than the anchor term in communications that include the anchor term made by other users who are connected to the communicating user in the social networking system within a predetermined interval of time immediately preceding identifying the anchor term;
presenting one or more of the candidate nodes to the communicating user based on the determined scores;
prompting the communicating user to select one of the presented candidate nodes to represent one of the multiple meanings of the anchor term; and
responsive to receiving a candidate node selection from the communicating user, generating a post within a newsfeed including the received communication, the post associated with an object maintained by the social networking system representing the selected candidate node, the post including the anchor term in hyperlink text that, when selected, directs a user to a web page of the social networking system associated with the object.

2. The computer-implemented method of claim 1, wherein presenting one or more of the candidate nodes to the communicating user comprises displaying the candidate nodes to the user in a drop-down list.

3. The computer-implemented method of claim 2, wherein the candidate node order in the drop-down list is based on determined scores.

4. The computer-implemented method of claim 2, wherein prompting the communicating user to select one of the presented candidate nodes comprises providing an interface for the communicating user to select one of the candidate nodes in the drop-down list.

5. The computer-implemented method of claim 1, wherein associating the received communication with an object maintained by the social networking system representing the candidate node further comprises:

replacing the anchor term text in the received communication with hyperlink text, the hyperlink text directing the user to a social networking system page associated with the selected candidate node when selected.

6. The computer-implemented method of claim 1, wherein the received communication comprises a status update.

7. The computer-implemented method of claim 1, wherein the post comprises a status update and is posted to the communicating user's social networking system profile.

8. The computer-implemented method of claim 1, wherein the post comprises one of: an email, an instant message, and a text/SMS message.

9. The computer-implemented method of claim 1, wherein the post comprises a comment on a content item.

10. The computer-implemented method of claim 1, wherein identifying an anchor term in the communication comprises:

parsing the communication into one or more terms, wherein each term comprises a set of alpha-numeric characters; and selecting one of the one or more parsed terms for use as the anchor term.

11. The computer-implemented method of claim 10, wherein articles, interjections, conjunctions and prepositions are removed from the communication prior to parsing the communication into one or more terms.

12. The computer-implemented method of claim 11, wherein adverbs and pronouns are removed from the communication prior to parsing the communication into one or more terms.

13. The computer-implemented method of claim 10, wherein each parsed term comprises a noun.

14. The computer-implemented method of claim 10, wherein selecting one of the one or more parsed terms for use as the anchor term comprises selecting the least ambiguous parsed term.

15. The computer-implemented method of claim 10, wherein selecting one of the one or more parsed terms for use as the anchor term comprises selecting the most ambiguous parsed term.

16. The computer-implemented method of claim 1, wherein identifying a set of candidate nodes comprises performing a keyword search of the dictionary for dictionary nodes including anchor term text.

17. The computer-implemented method of claim 1, wherein users connected to the communicating user comprise users that have explicitly established a connection with the communicating user.

18. The computer-implemented method of claim 1, wherein users connected to the communicating user comprise users with biographic information in common with the communicating user.

19. The computer-implemented method of claim 1, wherein users connected to the communicating user comprise users with user interests in common with the communicating user.

20. The computer-implemented method of claim 1, wherein users connected to the communicating user comprise users in a common network with the communicating user.

21. The computer-implemented method of claim 1, wherein determining a score for each of one or more of the candidate nodes representative of a likelihood that the candidate node represents one of the multiple meanings of the anchor term comprises modifying a previously determined set of candidate node scores based upon the one or more dictionary nodes.

22. A system comprising:

a non-transitory computer-readable storage medium storing executable instructions that, when executed by a processor, cause the system to perform steps comprising:

receiving a communication from a communicating user via an interface of a social networking system for communicating to social networking system users via the social networking system;

identifying an anchor term in the communication, the anchor term having multiple meanings and identified based on a set of dictionary nodes each associated with a potential mean of the anchor term, the set of dictionary nodes identified by querying a dictionary with the anchor term;

identifying a set of candidate nodes based on the set of dictionary nodes from a dictionary that comprises a set of dictionary nodes, each dictionary node representing a topic, wherein each identified candidate node comprises a dictionary node that is a candidate for representing one of the multiple meanings of the anchor term;

after identifying the anchor term, determining a score for each of one or more of the candidate nodes representative of a likelihood that the candidate node represents one of the multiple meanings of the anchor term based at least in part on terms other than the anchor term in communications that include the anchor term made by other users who are connected to the communicating user in the social networking system within a predetermined interval of time immediately preceding identifying the anchor term;

presenting one or more of the candidate nodes to the communicating user based on the determined scores;

prompting the communicating user to select one of the presented candidate nodes to represent one of the multiple meanings of the anchor term; and responsive to receiving a candidate node selection from the communicating user, generating a post within a newsfeed including the received communication, the post associated with an object maintained by the social networking system representing the selected candidate node, the post including the anchor term in hyperlink text that, when selected, directs a user to a web page of the social networking system associated with the object; and a processor configured to execute the instructions.

23. A non-transitory computer-readable storage medium storing executable computer instructions that, when executed by a processor, cause the processor to perform steps comprising:

receiving a communication from a communicating user via an interface of a social networking system for communicating to social networking system users via the social networking system;

identifying an anchor term in the communication, the anchor term having multiple meanings and identified based on a set of dictionary nodes associated with a potential meaning of the anchor term, the set of dictionary nodes identified by querying a dictionary with the anchor term;

identifying a set of candidate nodes based on the set of dictionary nodes from a dictionary that comprises a set of dictionary nodes, each dictionary node representing a topic, wherein each identified candidate node comprises a dictionary node that is a candidate for representing one of the multiple meanings of the anchor term;

after identifying the anchor term, determining a score for each of one or more of the candidate nodes representative of a likelihood that the candidate node represents one of the multiple meanings of the anchor term based at least in part on terms other than the anchor term in communications that include the anchor term made by other users who are connected to the communicating user in the social networking system within a predetermined interval of time immediately preceding identifying the anchor term;

presenting one or more of the candidate nodes to the communicating user based on the determined scores;

prompting the communicating user to select one of the presented candidate nodes to represent one of the multiple meanings of the anchor term; and responsive to receiving a candidate node selection from the communicating user, generating a post within a newsfeed including the received communication, the post associated with an object maintained by the social networking system representing the selected candidate node, the post including the anchor term in hyperlink text that, when selected, directs a user to a web page of the social networking system associated with the object.

* * * * *